United States Patent [19]

Nice

[11] Patent Number: 5,561,249

[45] Date of Patent: Oct. 1, 1996

[54] INSERTABLE FLOW METER WITH DUAL SENSORS

[76] Inventor: Gerald J. Nice, 34 Princeton Dr., Manalapan, N.J. 07726

[21] Appl. No.: 181,830

[22] Filed: Dec. 23, 1993

[51] Int. Cl.$^6$ ............................................... G01F 1/32
[52] U.S. Cl. ............................................... 73/861.22
[58] Field of Search ........................... 73/861.22, 861.24, 73/202

[56] References Cited

U.S. PATENT DOCUMENTS

| | | |
|---|---|---|
| Re. 31,217 | 4/1983 | Rodely. |
| 3,572,117 | 5/1968 | Rodely. |
| 3,587,312 | 12/1968 | McMurtrie. |
| 3,719,073 | 3/1973 | Mahon. |
| 3,733,897 | 5/1973 | Herzi. |
| 3,797,309 | 3/1974 | Joy et al.. |
| 3,972,232 | 8/1976 | Miller et al.. |
| 4,031,757 | 6/1977 | Colton. |
| 4,088,020 | 5/1978 | Sgourakes et al.. |
| 4,220,046 | 9/1980 | Sqourakes. |
| 4,240,299 | 12/1980 | Joy et al.. |
| 4,464,939 | 8/1984 | Corpron. |
| 4,526,040 | 7/1985 | Matsubara. |
| 4,559,832 | 12/1985 | Burlage et al.. |
| 4,562,745 | 1/1986 | Para ........................ 73/861.22 |
| 4,770,035 | 9/1988 | Kolkebeck et al. .......... 73/861.22 |
| 4,862,750 | 9/1989 | Nice. |
| 4,879,909 | 11/1989 | Lew ........................ 73/861.24 |

OTHER PUBLICATIONS

Single Sensor Vortex–Bar Brochure Manual For Single Sensor Vortex–Bar.

*Primary Examiner*—Richard Chilcot
*Assistant Examiner*—William L. Oen
*Attorney, Agent, or Firm*—Lerner, David, Littenberg, Krumholz & Mentlik

[57] ABSTRACT

A fluid velocity meter having an elongate body defining a flow opening therein bounded by an inner top wall, inner bottom wall, and a pair of side walls with the flow opening extending completely through the elongate body to allow a stream of fluid to pass through the flow opening. A vortex-generating element is provided within the flow opening to direct vortices to impinge on the inner top and bottom walls in an alternate fashion. First and second sensors are disposed within the elongate body and positioned adjacent to the inner top and bottom walls. Output means are provided for generating a signal indicative of the force supplied to each sensor, and thus the velocity of the flowing fluid can be determined.

14 Claims, 1 Drawing Sheet

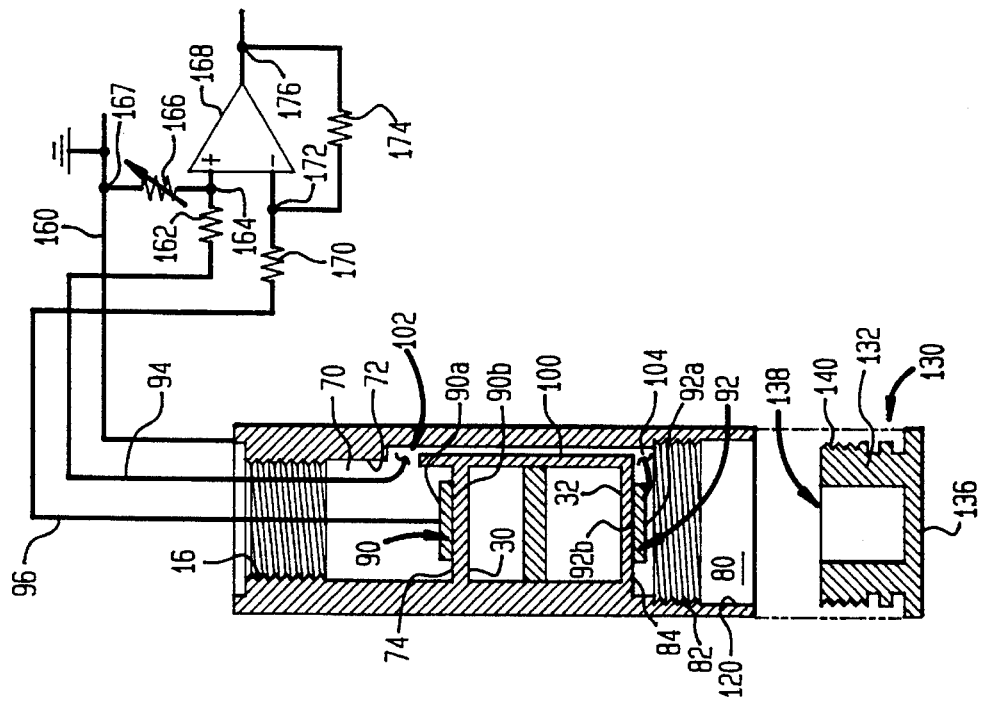
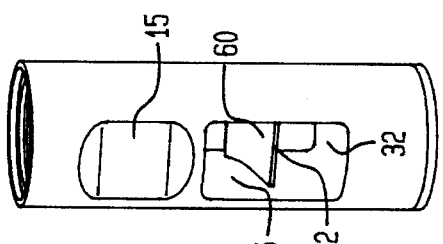
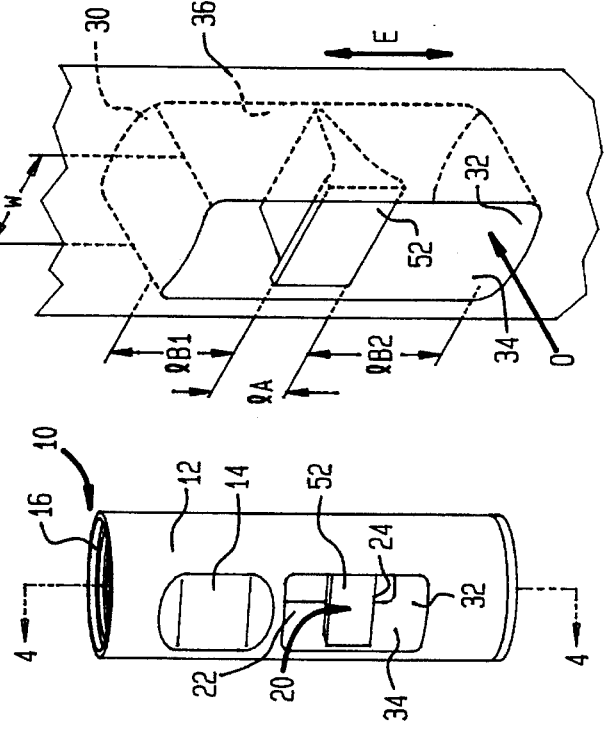
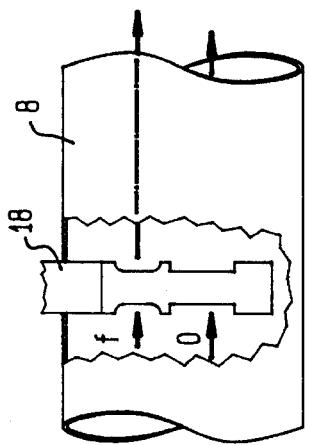

5,561,249

INSERTABLE FLOW METER WITH DUAL SENSORS

FIELD OF THE INVENTION

The present invention relates to the field of flow measurement devices and more particularly to insertion-type fluid velocity meters.

BACKGROUND OF THE INVENTION

It is well-known to those in the field of flow measurement that the velocity of a fluid can be determined by a phenomenon known as a "von Karman vortex street" in which fluid vortices generated by a fluid flowing past a bluff body will pass downstream on alternate sides of the bluff body. The number of fluid vortices shed past the bluff body during a given time period is proportional to the velocity of a passing fluid.

Numerous flow meters have been developed over the years using the principal of a von Karman vortex street. For instance, U.S. Pat. No. 4,862,750, issued to the present inventor, discloses a fluid velocity meter adapted to span the full diameter of the pipe having dual force sensors disposed on opposite sides of a tail piece located downstream from the vortex generating element. The vortices which shed from the vortex generating element pass downstream and alternately impinge on each of the sensors in the tail piece to thereby produce an output signal related to the deformation of the sensors. The sensors are positioned in close proximity to one another in the tail piece and a filler material is provided between the sensors to permit independent lateral movement of the sensors relative to one another. This arrangement provides excellent measurement properties. However, one shortcoming of this arrangement is that the signals produced by the sensors in the tail piece are not completely independent of one another, i.e., the inward deformation of one sensor tends to cause the outward deformation of the other sensor, which tends to produce unwanted secondary signals and can complicate the signal processing of the flow meter.

U.S. Pat. No. 4,559,832 to Burlage et al. discloses a vortex shedding meter which employs a pair of piezoelectric force sensors disposed in a sensor chamber, with the sensors being separated by a rigid metallic portion. The vortex generating element, however, is not integral with the sensor carrying body but is separately provided and located upstream from the sensor carrying body.

Another flow meter, U.S. Pat. No. 3,587,312 to McMurtrie et al., discloses a differential sensor bluff body flow meter wherein a pair of sensors are integrally mounted on a bluff body which is removably mounted through an aperture in the pipe. The sensors are integrally formed as a part of the bluff body which provides the oscillatory fluid flow.

There are also other flow meters which sense the shedded vortices through the monitoring of a modulated ultra-sonic signal, for example, U.S. Pat. Nos. 3,797,309, 4,031,757 and 4,240,229. All of these aforementioned patents disclose sonic vortex sensors whereby a transmitted and reflected sonic signal is acted upon by the vortices generated past a strut element.

Despite the multitude of differently constructed fluid velocity meters, there is still a further need to provide an improved fluid velocity meter, and especially an improved flow meter which is of the insertion-type, i.e., a universal flow meter directly insertable into pipes or conduits with different diameters rather than being constructed in a casing having a pre-determined diameter to match the pipe next to which it is applied, i.e., the casing carrying the flow meter must be adapted to fit more or less flush between two joining pipe sections. Such insertion-type flow meters are advantageous since they eliminate the need to change the dimensions and construction of the flow meter and casing according to the diameter of the pipe to which they are applied. Thus, insertion-type flow meters are generally more cost effective since it is not necessary to purchase a different size flow meter for a given diameter. Moreover, such an insertion type flow meter is easily insertable and removable from a pipe for easy access for repairs, replacement or the like.

Not only is there a need to provide an improved insertion-type flow meter with the aforementioned advantages, but there has also been a need to eliminate the problems associated with vortex shedding flow meters heretofore which do not adequately compensate for flow disturbances which interfere with the measurement of the vortices and thereby producing inaccurate measurements of fluid velocity. In this regard, it is desirable to provide a flow meter that is capable of minimizing or compensating for unwanted fluid pulsations and vibrations that can occur within the conduit as well as other forms of fluid noise which tend to interfere with the accuracy and operation of the flow meter.

The invention of the present application addresses the aforesaid needs.

SUMMARY OF THE INVENTION

The present invention provides a fluid velocity meter comprising an elongate body which is preferably cylindrical in shape and defines an elongation direction. The elongate body is provided with a flow opening bounded by an inner top wall, an inner bottom wall, and a pair of sidewalls. The flow opening extends completely through the elongate body in an opening direction transverse to the elongation direction to allow a stream of fluid to pass through the elongate body through the flow opening when the body is disposed in a stream of fluid with the opening direction aligned with the direction of flow of the stream. The fluid velocity meter further includes a vortex-generating element for generating vortices and directing the vortices to impinge on the inner top and bottom walls in an alternate fashion. Further provided is a first sensor disposed within the elongate body and adjacent the inner top wall, a second sensor disposed within the elongate body and adjacent the inner bottom wall, and output means associated with each of the first and second sensors for generating a senor output signal indicative of the force applied to each of the first and second sensors.

In a preferred embodiment, the vortex-generating element is disposed within the flow opening so as to partition the flow opening into first and second flow openings. Preferably, the vortex-generating element extends from one of the inner side walls to the other inner side wall. More preferably, the first and second flow openings have substantially equal volumes.

A further aspect of the present invention provides a vortex-generating element which includes a forward face plate perpendicular to the opening direction and a tail piece disposed rearwardly of the face plate and extending parallel to the opening direction. In a preferred embodiment, the ratio of $A/B_1$ and $A/B_2$ is about 0.2 to 2, where A is the area of the face plate, $B_1$ is the cross-sectional area of the first flow opening, and $B_2$ is the cross-sectional area of the second flow opening. More preferably, the ratio of $A/B_1$ equals the ratio of $A/B_2$.

The present invention also provides signal processing means for merging signals from the output means to form a composite output signal which corresponds the forces applied to the sensors by the vortices that ultimately impinge on the inner top and bottom walls, so that changes in the sensor output signals corresponding to disturbance forces applied to the sensors in a simultaneous manner will cancel one another to thereby minimize alteration of the composite signal. Preferably, each of the sensors comprises a piezoelectric element having two poles, and the output means consists of conductor means for supplying two separate electrical potentials, where one such potential represents the force applied to each such piezoelectric element.

The present invention further provides a first cavity within the elongate body adjacent the inner top wall with the first sensor being disposed in the first cavity. Likewise, a second cavity is provided within the elongate body adjacent the inner bottom wall with the second sensor being disposed in the second cavity. A conductor channel is also provided within the elongate body in communication with at least the second cavity. The channel extends parallel to the elongation direction of the flow meter and adjacent the flow opening, and is adapted and arranged to carry at least one of the conductor means. Preferably, the channel is in communication with the first and second cavities.

The meter can also be provided with means for directing a fluid to flow in a downstream direction, and preferably a fluid carrying pipe, so that at least a part of the fluid impinges on the vortex-generating element.

BRIEF DESCRIPTION OF THE DRAWINGS

FIG. 1 is an enlarged front perspective view of a flow meter in accordance with one embodiment of the present invention.

FIG. 1A is a front perspective view of a portion of the flow meter shown in FIG. 1.

FIG. 2 is a rear perspective view of the flow meter shown in FIG. 1.

FIG. 3 is a side perspective view of the vortex-generating element shown in FIGS. 1, 1A and 2 in accordance with the present invention and separated from the flow meter for clarity of illustration.

FIG. 4 is a partially exploded cross-sectional view of the flow meter shown in FIG. 1 along line 4—4.

FIG. 5 is a perspective view of the flow meter shown in FIGS. 1 and 2 inserted into a fluid stream within a conduit which is partially cut away for clarity of illustration.

DETAILED DESCRIPTION OF A PREFERRED EMBODIMENT

Referring to FIG. 1, there is illustrated an insertion-type flow meter in accordance with one embodiment of the present invention generally designated as 10. Flow meter 10 includes a bar-like metallic casing or elongate body 12, which is preferably constructed from a bar of stainless steel and is cylindrical in shape. Elongate body 12 is constructed to form a flow opening 20 therein which extends completely through body 12 in an opening direction as indicated by arrow O (see FIGS. 1A and 5). Opening direction O is a direction generally perpendicular to the axis body 12, and hence generally perpendicular to the axis of body 12, and hence generally perpendicular to the direction of elongation of the body. As shown in FIGS. 1A and 5, flow opening 20 is formed to allow a stream of fluid f or the like to pass through body 12 when flow meter 10 is inserted into a stream of fluid f flowing within a conduit or pipe 8 and the opening direction of flow opening 20 is aligned with the direction of the flow of the stream.

Referring to FIG. 1A, flow opening 20 is bounded by an inner top wall 30, an inner bottom wall 32, and inner side walls 34 and 36. Flow opening is preferably rectangular in shape with side walls 34 and 36 preferably longer in length than inner top and bottom walls 30 and 32. It should be appreciated that relative terms such as upper and lower, above and below, etc. as used herein are to indicate directions relative to an imaginary plane extending through the center of flow opening 20 and parallel to the opening direction and the stream of flow, when the flow meter 10 is viewed in a vertical insertion direction showing FIG. 5 for example. In the particular embodiment illustrated, the upward direction is a direction parallel to the axis of the body. Thus, it should be understood as referring to the frame of reference with respect to this imaginary plane and not necessarily to the ordinary gravitational frame of reference, (1, 1A and 2). In the preferred embodiment, the height of flow opening 20 is approximately 1 and ½", the width is ⅞" and the depth is approximately 1 and 5/16".

Disposed within flow opening 20 is a vortex-generating element generally designated as 50. Referring to FIG. 3, in which vortex-generating element 50 is shown detached from flow meter 10 for clarity of illustration, vortex-generating element 50 preferably extends across inner side walls 34 and 36 and is positioned within flow opening 20 so as to bisect or partition flow opening 20 into a first upper flow opening 22 and a second lower flow opening 24 (See FIGS. 1, 1A and 2). More preferably, vortex-generating element 50 is disposed directly in the center of flow opening 20 such that upper flow opening 22 and lower flow opening 24 have substantially equal volumes and equal cross-sectional areas measured in sectioning planes perpendicular to the opening direction.

Referring to FIGS. 1A and 3, vortex-generating element 50 includes face plate 52 which extends perpendicularly to the opening direction, and upper and lower minor surfaces 54 and 56 which extend substantially parallel to the opening direction. Vortex-generating element 50 further includes a rearwardly extending tail piece 58 which is disposed downstream from face plate 52 and extends transverse thereto and generally parallel to the opening direction. Tail piece 58 is preferably integrally formed with face plate 52 and includes inwardly tapering upper and lower walls 60 and 62 which extend from upper and lower minor surfaces 54 and 56 respectively and taper inwardly and end at rear minor surface 64 generally parallel to face plate 52. Preferably, face plate 52 has a width w of ⅞", a length $l_A$ of 7/16 Vortex-generating element 50 preferably has a depth d of ¾" (FIG. 3).

Referring to FIG. 4, a first chamber or upper cavity 70 positioned above flow opening 20 is formed in body 12. A second chamber or lower cavity 80 positioned bellow flow opening 20 is also formed in body 12. Upper and lower cavities 70 and 80 respectively are completely isolated from the stream of flow and are substantially isolated from one another First cavity 70 is preferably cylindrical and concentric with the cylindrical shape of elongate body 12 and includes a circumferentially extending upstanding inner wall 72 and a transverse bottom wall 74 positioned directly above inner top wall 30 bounding flow opening 20. Provided on an upper portion of wall 72 is circumferential threading 16 adapted to receive a correspondingly threaded extension bar 18 (see FIG. 5). Extension bar 18 is securely attachable to flow meter 10 to allow insertion of flow meter 10 into pipes of different diameters as well as to isolate and carry the electrical wiring therethrough to a suitable display unit for displaying the fluid velocity (not shown). Provided on the exterior surface of elongate body 12 are wrench recesses 14 and 15 adapted to provide flat parallel surfaces to allow gripping by a wrench or the like for tightening flow meter 10 to extension bar 18 prior to insertion into pipe 8.

Likewise, second cavity 80 is preferably cylindrical and concentric with the cylindrical shape of elongate body 12 and includes a circumferential wall. 82 extending downwardly and a transverse top wall 84 positioned directly below inner bottom wall 32 bounding flow opening 20. First and second pressure-sensitive sensors 90 and 92 are respectively disposed on bottom wall 74 of first chamber 70 and on top wall 84 of second chamber 80, and preferably comprise flat, circular, platelike quartz piezoelectric elements. Sensors 90 and 92 are preferably bonded to walls 74 and 84 respectively using an adhesive that is electrically conductive.

Each pressure sensitive sensor 90 and 92 is preferably a deformable body arranged to allow development of an electrical potential between its major surfaces as described below when the wall and the sensors are deformed. This electrical potential varies in accordance with the degree of deformation and thus varies with the force supplied to deform the wall and the sensor. As known to those skilled in the art, such piezoelectric sensors can develop appreciable electrical potentials even when the deformations involved are rather small or even at a molecular level. Major surfaces 90a and 92a of sensors 90 and 92 disposed facing flow opening 20 respectively constitute the positive poles of piezoelectric element 90 and 92. When a force is directed to inner top wall 30 and thus to wall 74 and sensor 90, for example, the electrical potential developed at pole 90a, will become more positive with respect to the electrical potential at opposite pole 90b. Thus, the potential applied to lead 96 will become more positive with respect to the potential of common lead 160. Likewise, when a force is applied to inner bottom wall 32 and therefore major surface 92a of sensor 90, the potential on lead 94 will become more positive with respect to the potential on common lead 160.

Common lead 160 is connected to ground which in turn is preferably connected to elongate body 12 which serves as the common ground conductor. Lead 94 is connected through an input resistor 162 to a node 164 which is in turn connected to a potentiometer or variable resistor 166. Variable resistor 166 is in turn connected to ground or common lead 160 at node 167. Node 164 is also connected to the positive input terminal of an operational amplifier 168. Lead 96 is connected through a further input resistor 170 to a node 172. A feedback resistor 174 is coupled between the output node 172 and node 176 which is connected to the output of operational amplifier 168. Node 172 is connected to the negative input of operational amplifier 168. In this arrangement, potentiometer 166 attenuates the signal from piezoelectric sensor 92. The degree of this attenuation or negative gain can be varied by adjusting the potentiometer and hence the resistance. The output of operational amplifier 168 will be a composite signal representing the difference between the signal from element 92 as attenuated and the signal from sensor 90.

Within elongate body 12 is also disposed a conductor channel 100 extending upwardly and downwardly, i.e., parallel to the longitudinal axis of body 12. Channel 100 extends from an upper opening 102 in communication with first cavity 70 at wall 72 to a lower opening 104 in communication with second cavity 80 at wall 82. Conductor channel preferably has a diameter of 0.125 inches and is adapted to carry conductor 94 from second cavity 80 to first cavity 70 through the side of elongate body 12 so as to remain within flow meter 10 and isolated from the stream of flow.

A closure cap 130 is also provided for sealing second cavity 80 as described below. Closure cap 130 is preferably cylindrical in shape. Closure cap 130 includes an annular base 136 and a circumferentially extensive upstanding wall 132 defining a closure cap cavity 138 therein. Closure cap cavity 138 is adapted to be disposed within second cavity 80 and surround sensor 92 when cap 130 is in its closure position, i.e., when cap 130 is fitted to elongate body 12 to thereby seal off lower cavity 80 from the outside environment. Upstanding wall 132 is further provided with outer threaded portion 140 corresponding to threading 120 formed on wall 82 so that closure cap 132 can be screwed inside elongate body 12 with only base 136 remaining visible to the exterior and flush with elongate body 12 when cap 132 is completely threaded inside second cavity 80 in its closure position as shown in FIGS. 1, 2 and 5. Closure cap 130 thereby provides easy access to second cavity 80 and sensor 92 for installation and/or repair of sensor 92 and will impart a fluid-tight seal when it is in its closure position so as to isolate second cavity 80 and sensor 92 from the outside environment.

In use, flow meter 10 is inserted through an insertion hole in a pipe with flow opening 20 aligned with the direction of the flow of the stream such that fluid can flow around elongate body 12 as well as through upper and lower flow openings 22 and 24 (FIG. 5). As the flowing fluid impinges on face plate 52, swirling vortices are formed and shed past face plate 52 in an alternating fashion in accordance with the well-recognized von Karman vortex street principle. These vortices alternatively impinge on both inner top wall 30 and inner bottom wall 32 and the vibrations are then picked up by each piezoelectric sensor which in turn generates signals at given time periods indicative of the force sensed. The signal produced from each sensor is 180 degrees out of phase with the other, i.e., as one sensor generates an independent signal indicative of the vortex pressure, the other sensor produces an equal independent signal of opposite polarity. The shifting of the vortex signal from one sensor to the other generates a composite oscillatory signal at the output node 176 of amplifier 168 which continues uninterrupted so long as the flow of fluid continues. The frequency of oscillation is directly related to the velocity of the fluid, and hence to the flow rate. These signals are then processed and used to determine the velocity of the flowing fluid.

An important advantage that follows from the use of the present invention's dual sensor insertion-type flow meter is the ability to minimize undesirable flow noise or extraneous disturbances that occur within a pipe due to causes other than von Karman vortices. Such extraneous disturbances can interfere with the sensing of shedded vortices and thus the accuracy of the flow meter. With the present invention, however, the arrangement of the dual sensors both above and below flow opening 20 is highly advantageous. Extraneous fluid disturbances within the stream of flow will tend to impinge nearly simultaneously on both inner top wall 30 and inner bottom wall 32, and thus piezoelectric sensors 90 and 92, thereby producing signals "in phase" which can be cancelled by differential amplifier 168 without disturbing the measurement of the intentionally created out of phase vortices produced by vortex-generating element 50.

The proportions and dimensional relationships of the vortex-generating element 50 and the flow opening 20 according to the preferred embodiment of the present invention contribute significantly to its performance. Flow meter 10 should be constructed such that the fluid vortices generated by element 50 impinge at least partially, and preferably completely, on inner top wall 30 and inner bottom wall 32 when flow meter 10 is placed in the stream of fluid. Although other geometrical shapes for fluid opening 20 may be used with the present invention, it has been found that the use of a rectangular opening for flow opening 20 provides excellent even and well-defined vortices.

The ratio between the area A of face plate 52 defined by its length $l_A$×its width w to the area $B_1$, of upper flow opening 22 measured by the length $l_{B1}$×width w, i.e., the ratio $A/B_1$, is preferably between the range of 0.2 to 2, and more preferably about 0.8. The ratio $A/B_2$, wherein area $B_2$ of lower flow opening 24 measured by the length $l_{B2}$×width w, is likewise preferably between the range of 0.2 to 2, and more preferably about 0.8. Most preferably area $B_2$ is equal to area B, such that $A/B_1=A/B_2$. Outside these ratios, the signal created by the alternating vortices looses accuracy as the vortices will not consistently impart a strong enough force on inner top and bottom walls 32 and sensor elements 90 and 92 for reliable measurement of fluid velocity.

The physical configuration of body 12 and related elements offer several interrelated advantages. The generally planar side walls 34 and 36 bounding the flow passageways provide a uniform width for each of the flow passages. 22 and 24, and permit top and bottom surfaces 30 and 32 to have substantial areas for sensing vortices. This configuration also leaves enough room within the cylindrical profile of body 12 to accommodate wire passage 100, and to provide structural rigidity in the areas of the housing bordering the flow passageways. Walls 30 and 32 can be machined readily to relatively small thicknesses, typically anywhere between about 0.1" and 0.001", more preferably between about 0.02" and 0.03" so as to make then deformable. Moreover, walls 30 and 32 as well as the vortex-shedding body 52 and the sensors 90 and 92 are well protected against damage during the handling, installation and use of the meter.

The flow meter according to this embodiment only samples an inch and a half of the flow profile within the conduit. Therefore, it is less susceptible to flow disturbances than traditional flow meters that same a much larger area of the flow profile, can produce a more accurate reading in flow environments where other flow meters will hardly work at all. Thus, the flow meter in accordance with a preferred embodiment of the present invention is highly versatile and is adapted to be used in pipes of almost any diameter, so long as fluid can flow through flow opening 20 and generate vortices that will impinge on inner top and bottom walls 30 an 32. The flow meter can be used in pipes preferably having a diameter as small as 3" to pipes with diameters of longer lengths.

As these and other objects, features and advantages of the present invention can be utilized without departing from the present invention as defined by the claims, the foregoing description of the preferred embodiment should be taken by way of illustration rather than by way of limitation of the present invention as defined by the claims.

What is claimed is:

1. An insertion-type fluid velocity meter adapted for removable insertion into a fluid conduit comprising:

(a) an elongate body defining an elongation direction, said elongate body having a substantially rectangular flow opening bounded by an inner top wall, an inner bottom wall, and a pair of side walls, said flow opening extending completely through said elongate body in an opening direction transverse to said elongation direction to allow a stream of fluid to pass through said elongate body through said flow opening when said body is disposed in a stream of fluid with said opening direction aligned with the direction of flow of said stream said elongate body being constructed and arranged for removable insertion into fluid conduits of different diameters;

(b) a vortex-generating element integrally attached to said elongate body and disposed within said flow opening for generating substantially uniform vortices and directing said vortices to impinge on said inner top wall and said inner bottom wall in an alternate fashion;

(c) a first pressure element disposed within said elongate body and adjacent said inner top wall;

(d) a second pressure element disposed within said elongate body and adjacent said inner bottom wall, so that said first and second pressure elements are operative to sense said vortices impinging on said inner top wall and said inner bottom wall, respectively; and (e) output means associated with each of said first and second pressure elements for generating an output signal indicative of the force applied to each of said first and second pressure elements.

2. The meter as claimed in claim 1, wherein said vortex-generating element is disposed within said flow opening so as to partition said flow opening into a first and second flow openings.

3. The meter as claimed in claim 1, wherein said vortex-generating element extends from one of said inner side walls to the other said inner side wall so that said vortex-generating element partitions said flow opening into first and second flow openings.

4. The meter as claimed in claim 3, wherein said first and second flow openings have substantially equal volumes.

5. The meter as claimed in claim 4, wherein said vortex-generating element includes a forward face plate perpendicular to said opening direction and a tail piece disposed rearwardly of said face plate and extending parallel to said opening direction.

6. The meter as claimed in claim 4, wherein the ratio $A/B_1$ and $A/B_2$ is about 0.2 to 2, where A is the area of said face plate, $B_1$ is the cross-sectional area of said first flow opening and $B_2$ is the cross-sectional area of bounding said second flow opening.

7. The meter as claimed in claim 6, wherein the ratio $A/B_1$ equals the ratio $A/B_2$.

8. The meter as claimed in claim 1, wherein said elongate body is cylindrical in shape.

9. The meter as claimed in claim 1, further comprising signal processing means for merging signals from said output means to form a composite output signal corresponding to forces applied to said pressure elements by said vortices alternately impinging on said inner top and bottom walls, so that changes in said sensor output signals corresponding to disturbance forces applied to said pressure elements in a simultaneous manner will cancel one another to thereby minimize alteration of said composite signal.

10. The meter as claimed in claim 1, wherein each of said pressure elements comprises a piezoelectric element having two poles, said output means including conductor means for supplying two separate electrical potentials, one such potential representing the force applied to each said piezoelectric element.

11. The meter as claimed in claim 10, wherein said meter further comprises a first cavity within said elongate body adjacent said inner top wall, said first sensor being disposed in said first cavity, and a second cavity within said elongate body adjacent said inner bottom wall, said second sensor being disposed in said second cavity, and a conductor channel within said elongate body in communication with at least said second cavity, said channel extending parallel to said elongation direction and adjacent said flow opening, said channel being adapted and arranged to carry at least one of said conductor means.

12. The meter as claimed in claim 11 wherein said channel is in communication with both said first and second cavities.

13. The meter as claimed in claim 1, further comprising means for directing a fluid to flow in a downstream direction so that at least a part of said fluid impinges on said vortex-generating element.

14. The meter as claimed in claim 13, wherein said means for directing includes a fluid carrying pipe, said meter being insertable into said pipe.

* * * * *

UNITED STATES PATENT AND TRADEMARK OFFICE
CERTIFICATE OF CORRECTION

PATENT NO.   : 5,561,249
DATED        : October 1, 1996
INVENTOR(S)  : Nice

It is certified that error appears in the above-identified patent and that said Letters Patent is hereby corrected as shown below:

Column 1, line 21, "yon" should read --von--.

Column 4, line 51, "7/16" should read --7/16".--.

Column 4, line 60, after "another" insert --.--.

Column 5, line 11, after --wall-- delete ".".

Column 7, line 27, after --passages-- delete ".".

Column 8, line 8, after "stream" insert --,--.

Signed and Sealed this

Seventeenth Day of December, 1996

Attest:

BRUCE LEHMAN

*Attesting Officer*     *Commissioner of Patents and Trademarks*